United States Patent
DiFoggio

(10) Patent No.: US 7,024,917 B2
(45) Date of Patent: Apr. 11, 2006

(54) METHOD AND APPARATUS FOR AN ACOUSTIC PULSE DECAY DENSITY DETERMINATION

(75) Inventor: Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/801,473

(22) Filed: Mar. 16, 2004

(65) Prior Publication Data

US 2005/0204808 A1   Sep. 22, 2005

(51) Int. Cl.
*G01N 9/24*   (2006.01)

(52) U.S. Cl. .................... 73/30.01; 73/32 A; 73/54.41; 73/602

(58) Field of Classification Search ............. 73/30.01, 73/32 A, 54.41, 61.79, 64.53, 602, 597, 152.58
See application file for complete search history.

(56) References Cited

U.S. PATENT DOCUMENTS

| | | | | |
|---|---|---|---|---|
| 2,959,054 A | * | 11/1960 | Welkowitz | .............. 73/861.02 |
| 2,966,058 A | * | 12/1960 | McSkimin | .................... 73/597 |
| 3,537,541 A | | 11/1970 | Desai et al. | ................... 73/597 |
| 4,262,523 A | | 4/1981 | Stansfeld | .................... 73/24.05 |
| 4,515,021 A | * | 5/1985 | Wallace et al. | ........... 73/861.27 |
| 4,571,693 A | | 2/1986 | Birchak et al. | ............... 702/54 |
| 4,583,393 A | | 4/1986 | Sweet | ........................ 73/32 A |
| 5,214,966 A | | 6/1993 | Delsing | ................... 73/861.28 |
| 5,341,345 A | * | 8/1994 | Warner et al. | ................ 367/99 |
| 5,386,714 A | | 2/1995 | Dames | ....................... 73/24.05 |
| 5,741,962 A | | 4/1998 | Birchak et al. | .......... 73/152.28 |
| 5,886,262 A | | 3/1999 | Sinha | .......................... 73/579 |
| 5,900,535 A | | 5/1999 | Doe | ........................... 73/32 A |
| 6,050,141 A | | 4/2000 | Tello et al. | .............. 73/152.56 |
| 6,082,181 A | | 7/2000 | Greenwood | ................ 73/32 A |
| 6,189,383 B1 | | 2/2001 | Tello et al. | ................... 73/589 |
| 6,330,831 B1 | | 12/2001 | Lynnworth et al. | ...... 73/861.28 |
| 6,378,364 B1 | | 4/2002 | Pelletier et al. | .......... 73/152.47 |
| 6,401,538 B1 | | 6/2002 | Han et al. | ..................... 73/599 |
| 6,672,163 B1 | * | 1/2004 | Han et al. | ..................... 73/597 |
| 6,763,698 B1 | * | 7/2004 | Greenwood | ................ 73/30.01 |
| 6,877,375 B1 | * | 4/2005 | Greenwood | .................. 73/597 |
| 2002/0178803 A1 | | 12/2002 | Pelletier et al. | |
| 2002/0184940 A1 | | 12/2002 | Storm, Jr. et al. | |

* cited by examiner

*Primary Examiner*—Hezron Williams
*Assistant Examiner*—Jacques Saint-Surin
(74) *Attorney, Agent, or Firm*—Madan, Mossman & Sriram, P.C.

(57) ABSTRACT

An acoustic transducer is in contact with a near wall that has a much different acoustic impedance than a fluid. The transducer transmits an acoustic pulse into into the wall (such as a plate, a wall of a tube or a wall of a sample chamber) that is in contact with this fluid. As the acoustic pulse bounces back and forth within this "near wall", each echo of this original pulse loses the same fraction of energy on each round trip so the echo energy decays exponentially. Knowing the acoustic impedance of the wall material and the reflection intensity at the transducer/wall interface (which is obtained when using air as the fluid), it is possible to calculate the acoustic impedance of an unknown fluid from the slope of a plot of the logarithm of echo energy versus echo number.

38 Claims, 9 Drawing Sheets

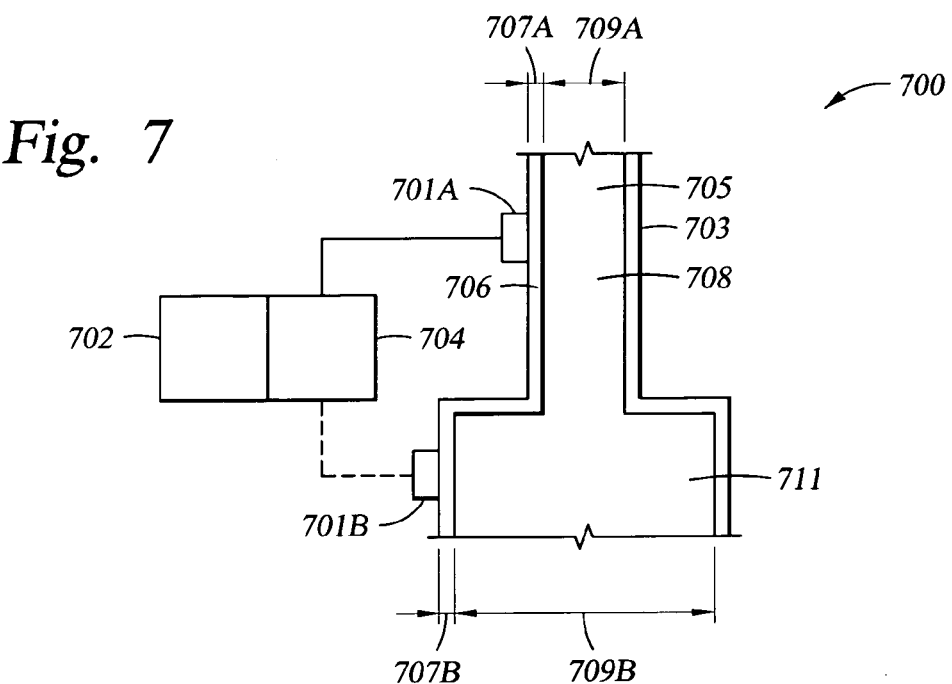
*Fig. 7*
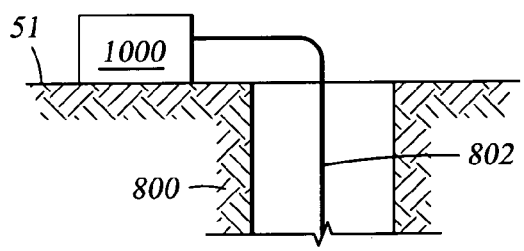
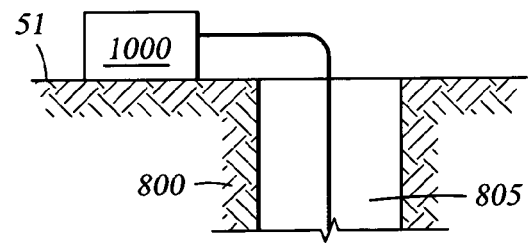
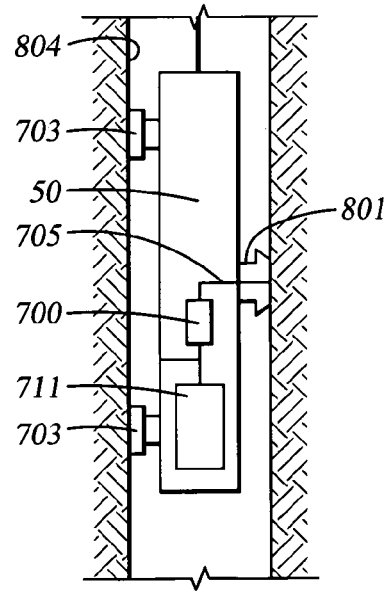
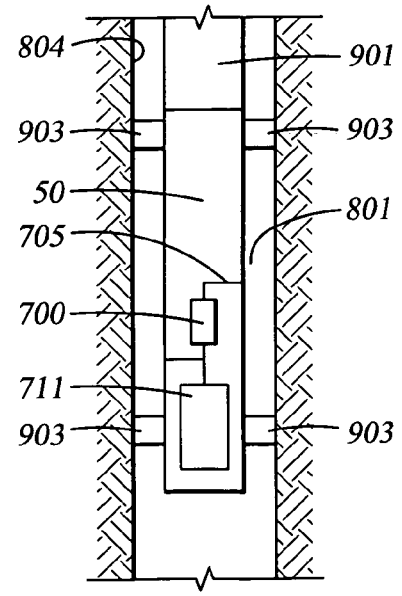
*Fig. 8*     *Fig. 9*

METHOD AND APPARATUS FOR AN ACOUSTIC PULSE DECAY DENSITY DETERMINATION

BACKGROUND OF THE INVENTION

1. Field of the Invention

The present invention relates generally to the field of fluid density measurements for a hydrocarbon or brine sample and relates in particular to an acoustic method and apparatus for determining the density of an unknown fluid such as drilling mud, brine, or a hydrocarbon in a downhole environment.

2. Summary of the Related Art

In various industrial processes that involve fluid material, it is useful to know the properties of the fluids involved. These fluid properties include, for example, density, compressibility, and acoustic impedance. Knowledge of the values of these various properties can be used to adjust process parameters or warn of impending calamity. In many applications, such as oil and gas well (borehole) drilling, fluid density is of particular interest. It is important to know or at least estimate the density of drilling fluid (also referred to as drilling mud) during a drilling operation, in order to prevent a blowout of the well caused by reduced mud weight resulting from incursion of natural gas into the drilling mud.

In a drilling operation, drilling fluid is pumped down the drill string (essentially a very long pipe) and exits at the drill bit. The drilling fluid then returns to the surface within an annulus formed between the outside of the drill string and the inside of the borehole. As the drill bit burrows into the geologic formations, the bit passes through zones containing various fluids. These zones can include saltwater, oil (hydrocarbons), lightweight fluids such as natural gas. If the pressure within the zone is greater than the pressure within the borehole, these fluids will enter the borehole and mix with the drilling fluid. As lightweight fluids mix with drilling fluid, the average density of the drilling fluid decreases. If the total weight of fluid within the borehole decreases too much, it can lead to a blowout when a high-pressure zone is entered. It is therefore very important that the density of the drilling fluid be accurately monitored. In producing wells, the local fluid density, along with other measurements, can be used to infer the proportions of oil, water and natural gas that the well is producing at various depths in the well.

Logging tools for measuring fluid density with varying degrees of success are well known in the art. One commonly known technique for measuring drilling fluid density involves the use of acoustic transducers, particularly ultrasonic transducers, as described in U.S. Pat. No. 4,571,693 (the '693 patent). The device described in the '693 patent provides an ultrasonic transducer coupled to the body of a probe. The ultrasonic device transmits and receives a first signal across a first solid/fluid interface and a second fluid/solid interface, in order to measure the sound velocity of the fluid. A second ultrasonic signal is provided as a reference signal generated by reflection off the surface of a void within the device that is hermetically sealed from contact with the fluid. Measurements of the first and second signals, as reflected off the two surfaces are used to calculate reflectance and acoustic impedance, from which density of the fluid may be inferred.

Other known methods and apparatuses for measuring the fluid density in boreholes, such as those described in U.S. Pat. Nos. 4,939,362 and 5,204,529, include the use of either chemical radioactive sources or electrically-controlled radioactive sources (e.g, pulsed neutron source), which present clear environmental and health hazards. It is therefore apparent that a need exists for an improved acoustic well logging tool and method to determine the density of drilling fluid and hydrocarbon sample associated with downhole operations in the borehole.

SUMMARY OF THE INVENTION

The present invention addresses some of the shortcomings of the related art discussed above. The present invention provides an accurate measurement of fluid density in a downhole environment. The present invention places an acoustic transducer in contact with a "near wall" whose acoustic impedance is much different than the impedance of the fluid to be measured. The transducer launches an acoustic pulse into this near wall (such as a plate, a wall of a tube, or a wall of a sample chamber). The other side of this near wall is in contact with a sample of unknown fluid. After sending out an acoustic pulse, this same transducer acts as a receiver to monitor the reverberations of this acoustic pulse within this near wall.

Each acoustic pulse contains many amplitude cycles so we subdivide the pulse into many small time windows (e.g., 4 ns each) and integrate the square of the acoustic amplitude in each small time window over the entire duration (e.g., 500 ns) of a pulse to obtain a measure of the energy contained within that pulse. The duration of the pulse has been called the "transducer ringdown time" by others ('962 lines 21–25 of col. 5). In the present invention, we use all the amplitude values within a pulse and so average out measurement errors in any single amplitude value. Further refinements to this calculation can be made by subtracting the integrated root-mean-square noise from the energy in each pulse. This RMS noise can be estimated from the observed noise between pulses.

As the acoustic pulse bounces back and forth within the near wall, each echo of this original pulse loses the same fraction of energy on each round trip. That is, the energy contained within each successive echo decays exponentially. Therefore, we plot the logarithm of the energy in each pulse packet against echo number and calculate the slope. The process of calculating a least-squares-fit slope over many points averages out any small random errors in the individual points being used and so improves the accuracy of the measurement compared to a single-point measurement.

As can be seen from FIGS. 2–4 of the present invention, the reflected acoustic energy is not concentrated into a single cycle as shown in the idealized illustration of FIG. 2 of the '693 patent but is distributed over several cycles. Also, the distribution of reflected energy between the largest amplitude cycle and its neighboring cycles within the same pulse is not constant but changes from pulse to pulse and reflection to reflection, which could be a significant source of inaccuracy in the '693 measurement.

Using a series of 3–5 pulse echoes, a substantially well-fitted slope of the logarithm of the pulse energy decline versus the pulse echo number is generated. This slope represents the product of the reflection coefficient at one face of the near wall (the face that is in contact with the fluid) multiplied by the reflection coefficient at the other face of the near wall (the face that is in contact with the transducer).

In an air-filled titanium tube, ignoring small effects of attenuated reflection due to air's high absorption of ultrasound, the reflection at the air/wall interface is approximately 100% because titanium, or any metal, has substantially greater acoustic impedance than air. Thus, we can calculate the reflection coefficient at the transducer/wall interface using the pulse energy decline slope of an air-filled tube as a reference value. Then, using this reflection coefficient at the transducer/wall interface, we can then calculate the reflection coefficient at the fluid/wall interface for an unknown fluid from the slope of the logarithm of the pulse echo energy versus pulse echo number. Because we know the acoustic impedance of the wall material, we can then use the measured reflection coefficient at this fluid/wall interface to calculate the acoustic impedance of the unknown fluid inside the wall. Finally, we calculate the fluid's density by dividing its measured acoustic impedance by its measured sound speed as explained immediately below.

A far wall reflector is placed in contact with the fluid at some known distance away from the near wall and the time to receive its reflection is measured. This distance is chosen to be large enough that the reflection off this far wall occurs at much later times, when reverberations of echoes within the near wall have become negligible. When practicing this invention using a sample chamber, this far reflector simply becomes the inner face of the opposite wall of the chamber that is in contact with the fluid. For example, the chamber can be a thick-walled hollow tube. Then, from the measured round trip travel time in the fluid and the known inner diameter of the tube, the speed of sound for the fluid can be calculated.

Thus, the density of an unknown fluid is determined from the reflection coefficient at the wall/fluid interface, the acoustic impedance of the wall material, and the sound speed of the fluid. Additional features and advantages of the invention will be evident from the following specification and figures.

BRIEF DESCRIPTION OF THE DRAWINGS

The following figures show an example of the present invention in which like elements in different figures bear the same reference numerals.

FIG. 7 illustrates a schematic representation of the present invention showing the transducer/pulser, processor and sample flow line of an exemplary embodiment of the present invention;

FIG. 8 depicts a schematic representation of a density measuring instrument disposed from a wire line in a well bore drilled through an earth formation;

FIG. 9 depicts a schematic representation of a density measuring instrument disposed form a drill string in a well bore drilled through an earth formation;

DETAILED DESCRIPTION OF AN EXEMPLARY EMBODIMENT OF THE PRESENT INVENTION

The present invention provides a method and apparatus for a real time downhole fluid density measurement. The invention is applicable to the determination of fluid density for use in association with wire line and monitoring while drilling applications.

Figure 1:
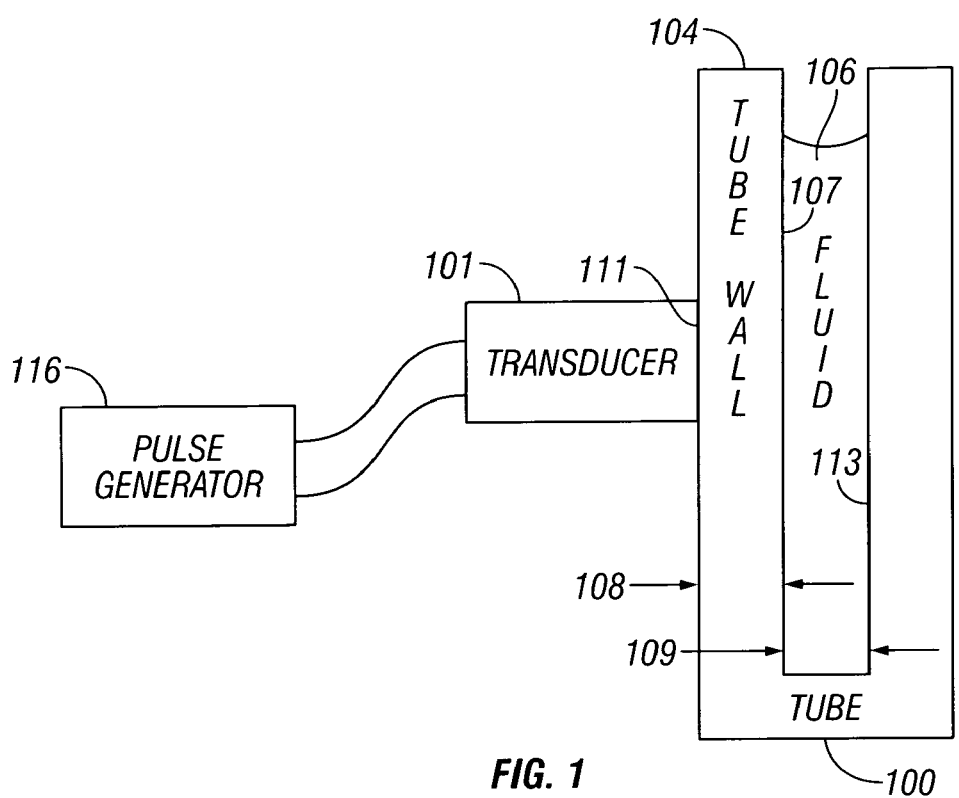
FIG. 1 illustrates a laboratory validation experiment in which the densities of two fluids, dodecane and water, were determined to demonstrate some of the principles of the present invention.
Figure 2:
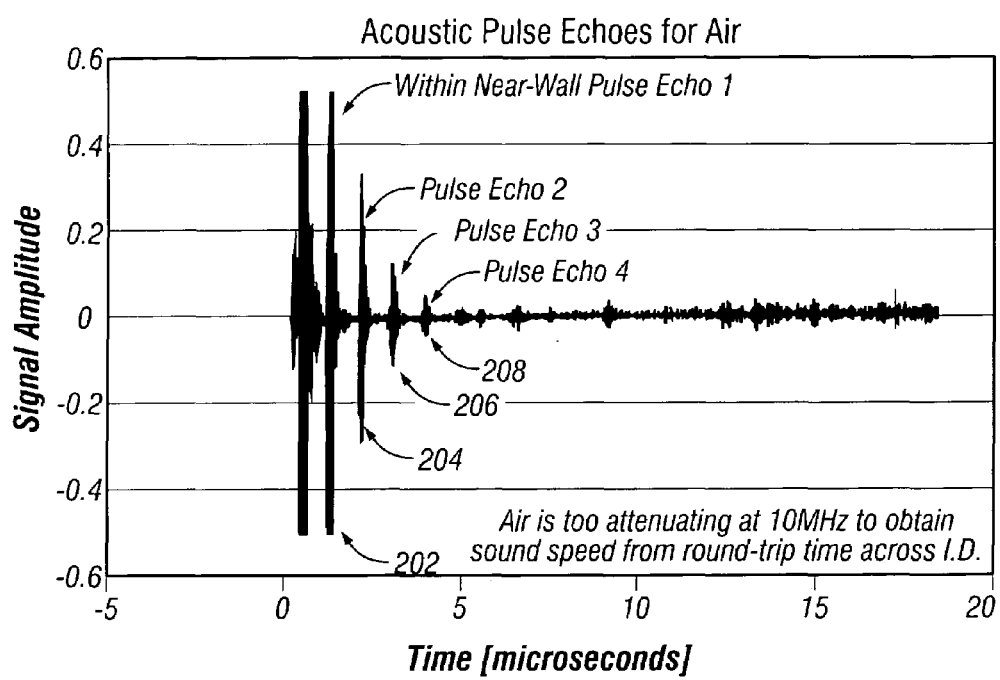
FIG. 2 illustrates the pulse energy decay for an acoustic pulse bouncing back and forth inside of the tube wall while the sample tube is filled with air.
Figure 3:
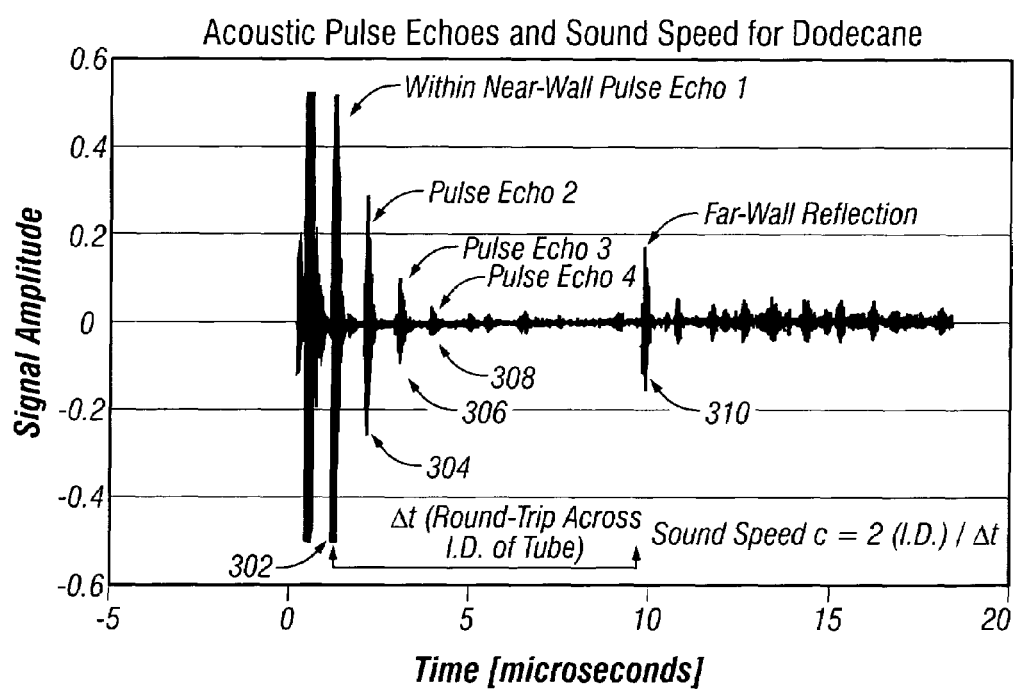
FIG. 3 illustrates the pulse energy decay for an acoustic pulse bouncing back and forth inside of the tube wall while the sample tube is filled with dodecane.
Figure 4:
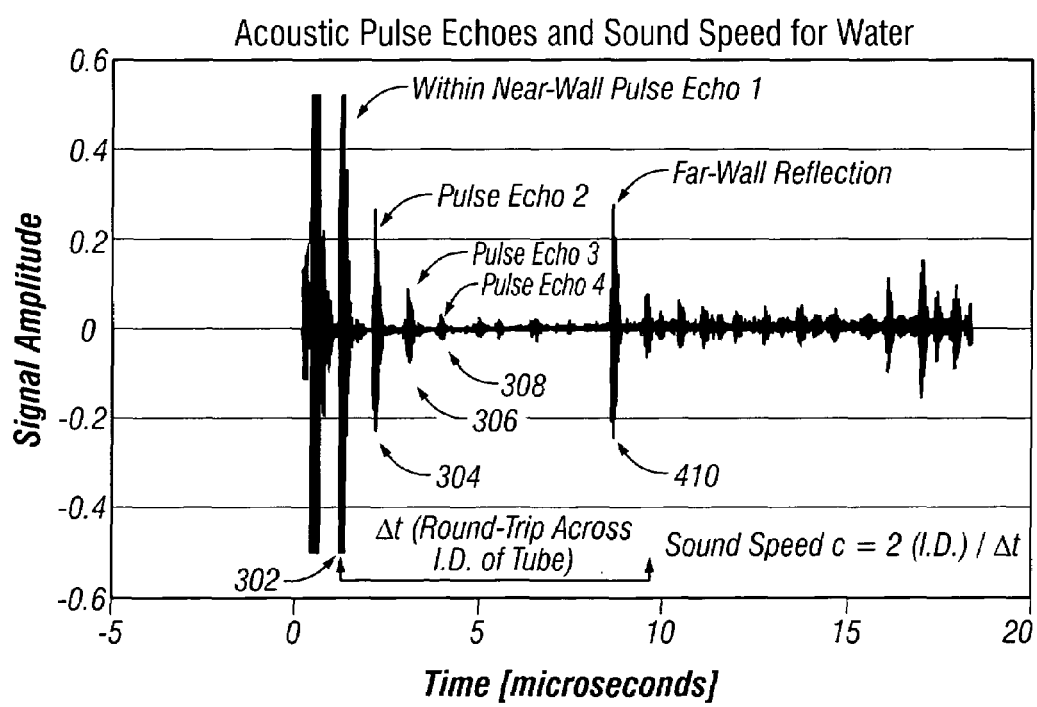
FIG. 4 illustrates the pulse energy decay for an acoustic pulse bouncing back and forth inside of the tube wall while the sample tube is filled with water.

Turning now to FIG. 1, in a laboratory simulation of the present invention, a small 10 MHz transducer 101 was attached to the outside wall 102 of a titanium alloy sample tube 100. As shown in FIG. 1, the sample tube 100 had dimensions of 0.218" internal diameter 109 and walls of 0.110" thickness 108. After the transducer 101 was pulsed, acoustic reflections 202, 204, 206 and 208 were monitored using this same transducer 101. The laboratory validation experiment was performed having different substances 106 filling the sample tube. The experiment was performed for air, oil, and water filling the tube. These experiments are as shown in FIGS. 2, 3, and 4 respectively below. As shown in FIG. 3, the sample tube is filled with dodecane and an acoustic pulse transmitted from transducer 101. After the transducer 101 was pulsed, the acoustic pulse echoes 302, 304, 306 and 308 were monitored using this same transducer 101. To be able to clearly separate the pulses, the pulse duration should be shorter than the time spacing between successive pulse echoes. If necessary, the near wall 104 can be locally thickened where the transducer contacts it to create a "standoff" of the same material, which would then serve to lengthen the time spacing between successive pulses. As shown in FIG. 4, the sample tube is filled with water and an acoustic pulse transmitted from transducer 101. After the transducer 101 was pulsed, acoustic pulse echoes 402, 404, 406 and 408 were monitored using this same transducer 101. The slope of logarithm of the pulse echo energy decay as the acoustic pulse bounces back and forth within the near wall 104 of the tube contacted by the transducer 101 is a measure of the acoustic impedance (sound speed times density) of the fluid filling the tube as shown in FIGS. 3 and 4.

As shown in FIGS. 3 and 4, as the acoustic pulse bounces back and forth within the wall 104 of the tube, the energy contained within successive pulses drops by the same factor, representing an exponential decline. Wall 104 of the tube is referred to as the "near wall" because it is the wall closest to the transducer. In the example of the invention a processor monitors the reverberation of acoustic pulses within this near wall to determine the acoustic impedance of an unknown fluid in contact with the opposite face of this wall. The area under the square of the amplitude of each pulse is a measure of pulse energy. With a series of 3–5 pulses 302, 304, 306, 308 or 402, 404, 406, 408, a substantially well-fitted slope 502, 504, or 506 respectively of the logarithm of the pulse energy decline versus the pulse number is generated. The slope goes as the logarithm of product of the intensity reflection coefficient at the near-wall/fluid interface 107 multiplied by the reflection coefficient at the near-wall/transducer interface 108. Ignoring the effects of attenuated reflection due to air's high absorption of ultrasound, then the reflection at the near-wall/air interface 107 is approximately 100% because titanium, or any metal, has substantially greater acoustic impedance than air.

Using the pulse energy decay slope 502 of the air-filled tube 100 as a reference value and ignoring any attenuated reflection, the reflection coefficient at the transducer/near-wall interface 108 can be calculated and subsequently used to determine the reflection coefficient at the near-wall/fluid interface 107 for an unknown fluid. The speed of sound for the fluid inside of the tube 100 is calculated from the round trip travel time for the reflection off the far-wall/fluid interface 113 of the tube 100 and the round trip distance across the inner diameter 109 of the tube. The first pulse echo from the far-wall/fluid interface 113 is followed by subsequent reverberation echoes within the far wall of the tube that are much smaller in amplitude and thus harder to detect and measure. Finally, we calculate the density of an unknown fluid from the reflection coefficient at the near-wall/fluid interface 107, the acoustic impedance of the near-wall material, and the speed of sound in the fluid.

In the laboratory validation experiment, a 10 MHz Panametrics 101 acoustic transducer, including a processor and pulse generating electronics 116 and a titanium sample tube 100 having a 0.218" inner diameter 109 and 0.110" wall thickness 108 were used to demonstrate the calculation of density in accordance with the present invention. Although a round tube was used in this verifying lab experiment, a tube having rectangular inner and/or outer cross sections that are parallel could also be used. Mounting the transducer against a flat face on the outside of the tube increases the amount of acoustic signal transmitted into it and having parallel inner faces reduces uncertainty in round trip pathlength associated with a sound ray not traveling exactly along the diameter of a circular cross section tube. The following parameter definitions are germane to the following discussion of the present invention.

$\rho_T$=Transducer density in g/cc
$c_T$=Transducer longitudinal sound speed
$\rho_W$=Transducer wall density in g/cc
$c_W$=Tube wall longitudinal sound speed
$\rho_F$=Fluid density in g/cc
$c_F$=Fluid sound speed
$R_{TW}$=Fraction of energy reflected at Transducer/Wall interface
$R_{WF}$=Fraction of energy reflected at Wall/Fluid interface
Specifically,
$R_{WA}$ for Wall/Air
$R_{WH}$ for Wall/H$_2$O
$R_{WO}$ fro Wall/Oil The energy of each successive pulse echo depends only on the fraction of energy reflected at each interface. That is, $$E_{reflected} \text{ is proportional to } (R_{TW}R_{WF})^1 \text{ for the 1}^{st} \text{ bounce within the tubing wall} \quad (1)$$

$$E_{reflected} \text{ is proportional to } (R_{TW}R_{WF})^2 \text{ for the 2nd bounce within tubing wall} \quad (2)$$

$$Y=E_{reflected}=k(R_{TW}R_{WF})^X \text{ for the X}^{th} \text{ bounce within tubing wall,} \quad (3)$$

where k is a proportionality constant.
Therefore, $$\ln(Y)=X \ln(R_{TW}R_{WF})+\ln(k)=mX+b \quad (4)$$

Where the slope m=ln($R_{TW}R_{WF}$), and the intercept b=ln(k).

Assuming that no energy is absorbed at the transducer/wall or at the wall/fluid interface, then the reflected energy fractions, $R_{TW}$ and $R_{WF}$, are given by, $$R_{TW}=(\rho_T c_T - \rho_W c_W)^2/(\rho_T c_T + \rho_W c_W)^2 \quad (5)$$

$$R_{WF}=(\rho_W c_W - \rho_F c_F)^2/(\rho_W c_W + \rho_F c_F)^2 \quad (6)$$

$$\rho_F=\rho_W(c_W/c_F)[1+\text{Sqrt}(R_{WF})]/[(1-\text{Sqrt}(R_{WF}))] \quad (7)$$

Figure 5:
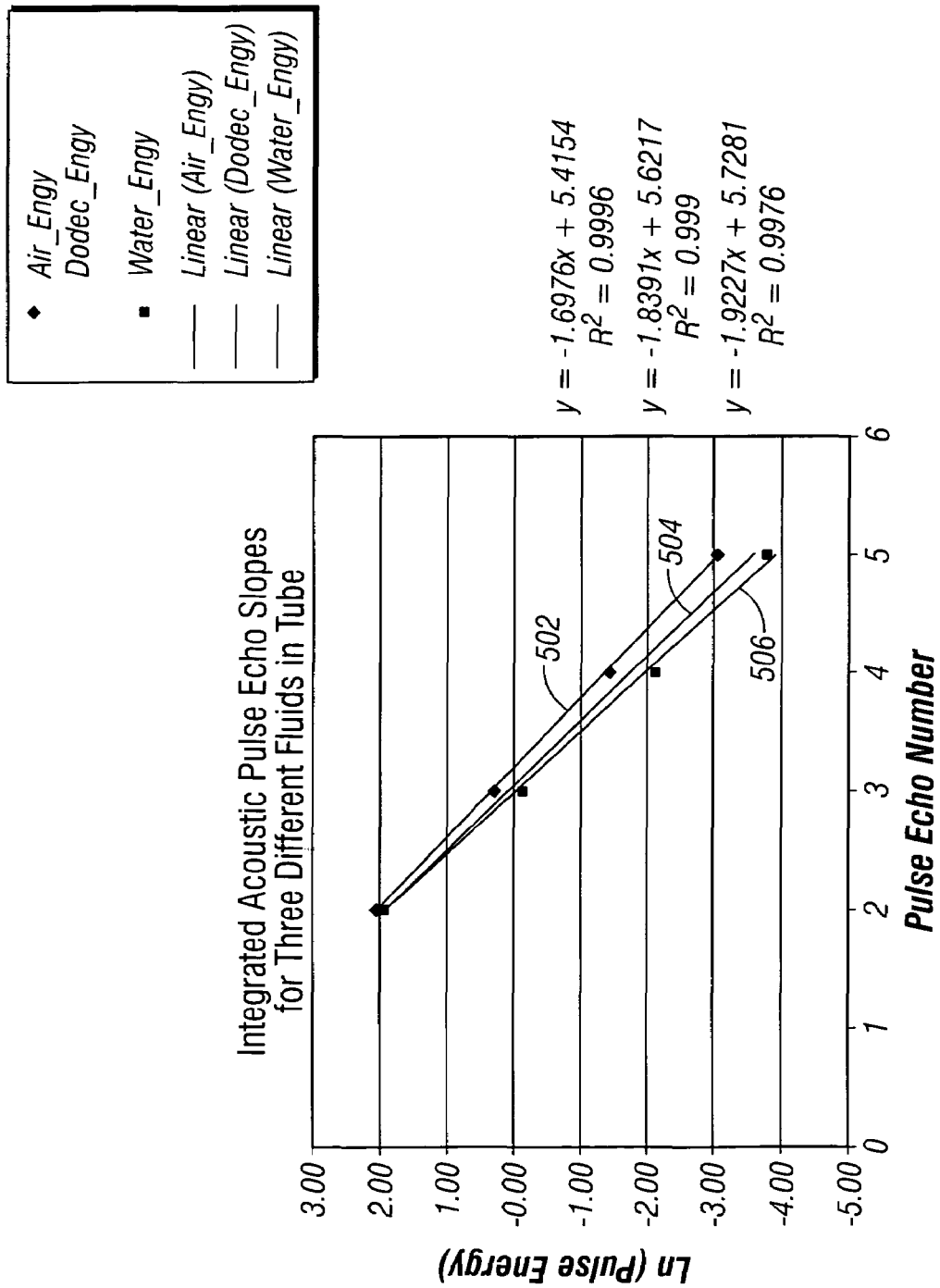
FIG. 5 illustrates the slope for pulse energy decay for acoustic pulses shown in FIGS. 2, 3 and 4.

FIG. 5 shows the slopes, m=ln($R_{TW}R_{WF}$), for air 502, dodecane 504, and water 506. If we assume that there is no attenuated reflectance at the near-wall/air interface 107, then (because the acoustic impedance of titanium is much greater than that of air) the fraction of energy reflected is given by, $$R_{WF}=R_{WA} \approx 1 \quad (8)$$

Thus, $$m_{Air} \approx \ln(R_{TW}) \quad (9)$$

$$R_{WF} \approx \exp(m_{Fluid})/\exp(m_{air}) \quad (10)$$

$$R_{WO} \approx \exp(m_{oil})/\exp(m_{air}) \quad (11)$$

$$R_{WH} \approx \exp(m_{H2O})/\exp(m_{air}) \quad (12)$$

Substituting $R_{WO}$ for $R_{WF}$ and $c_O$ for $c_F$ in Eq. 7, we obtain the density of oil as, $$\rho_O=\rho_W(c_W/c_O)[1+\text{Sqrt}(R_{WO})]/[(1-\text{Sqrt}(R_{WO}))] \quad (13)$$

Similarly, substituting $R_{WH}$ for $R_{WF}$ and $c_H$ for $c_F$ in Eq. 7, we obtain the density of H$_2$O as, $$\rho_H=\rho_W(c_W/c_H)[1+\text{Sqrt}(R_{WH})]/[(1-\text{Sqrt}(R_{WH}))] \quad (14)$$

Figure 6:
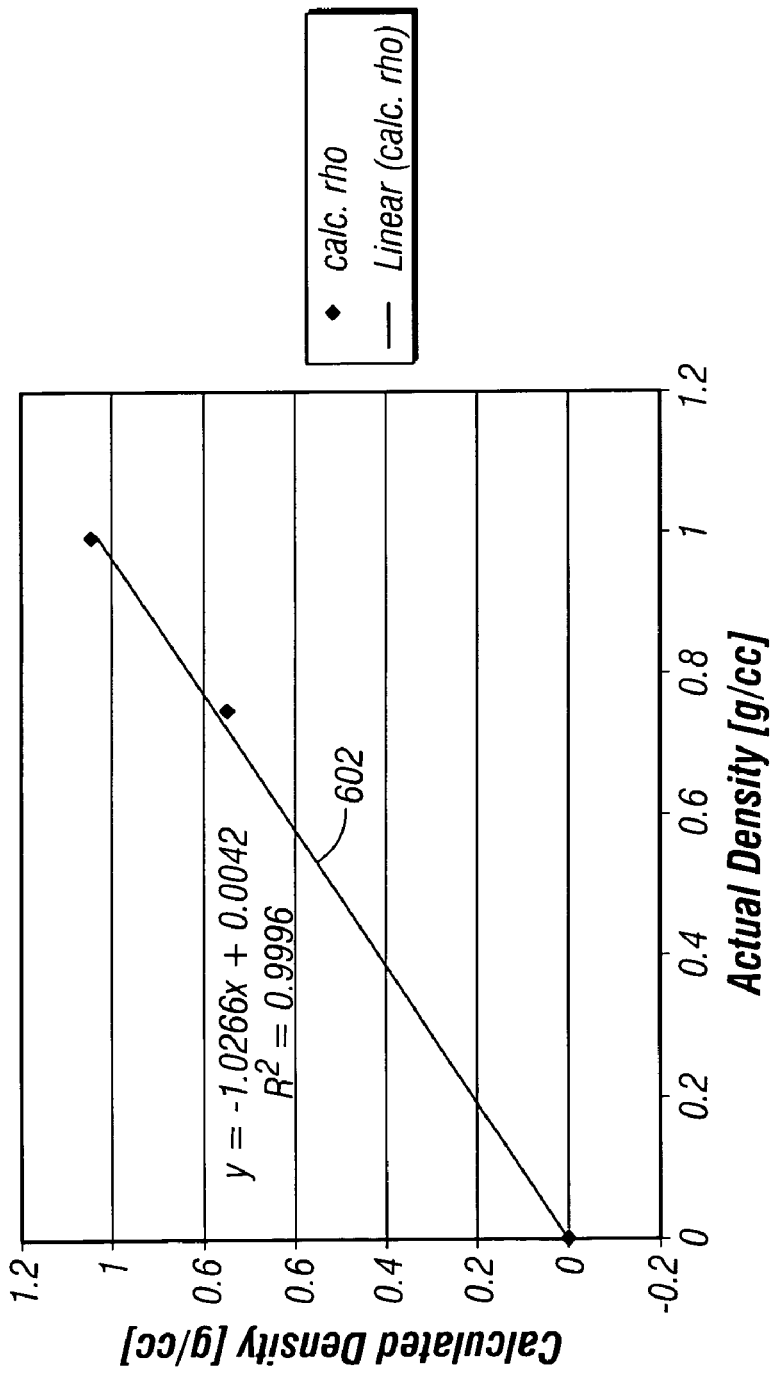
FIG. 6 illustrates a comparison of calculated to actual density for the present invention.

FIG. 6 illustrates a plot 602 of the calculated densities of oil ($\rho_O$) and of water ($\rho_H$) (see, equations 13 and 14 above) and the assumed (zero) density of air against the actual densities of these fluids. The correlation coefficient, $R^2$=0.9996, is quite good, thus it is clear from the laboratory validation experiment that the method and apparatus of the present invention correlates the actual density to the calculated density.

Finally, because the acoustic attenuation of fluids increases with their viscosities, we can, in principle, estimate fluid viscosity by measuring the attenuation across the inner diameter of the tube. The attenuation can be inferred from the discrepancy between the actual reflected signal and the expected value of an unattenuated reflected signal as calculated from measured $R_{TW}$ and $R_{WF}$). To be sure of actually monitoring attenuation, the example of the present invention uses acoustic pulses at more than one frequency because the attenuation increases as a power of frequency.

According to Dr. Mark Davidson of the University of Plymouth's Institute of Marine Studies (http://freespace.virgin.net/mark.davidson3/TL/TL.html), for water, viscous friction is the dominant mode of attenuation at frequencies above 1 MHZ and an approximate expression for the attenuation coefficient ($\alpha_1$) for fresh water due to viscous friction alone is:

$$\alpha_1=[2.1 \times 10^{-10}(T-38)^2+1.3 \times 10^{-7}]f^2 \text{dB/m} \quad (15)$$

where T is the temperature (centigrade) and f is the frequency (kHz).

M. Kekawy, H. Afifi, and Kh El-Nagar (National Institute for Standards, Egypt, http://symp15.nist.gov/pdf/p567.pdf) related the acoustic attenuation coefficient, $\alpha$, for oil to its viscosity, $\eta$, using the equation $$\eta=\rho \alpha c^3/26.3f^2 \quad (16)$$

where $\rho$ is the oil's density, c is the oil's sound speed and f is the frequency of the sound. Using the density, sound speed, and attenuation measured by the present invention and knowing the frequency, we can calculate the viscosity using Eq. 16. In practice, we expect that the round trip travel distance in the fluid would need to be increased substantially beyond the 0.436" of our lab verification experiment to make the viscous attenuation large enough to be accurately measured.

Turning now to FIG. 7, the present invention comprises a transducer 701, a sample flow line 703 or sample flow path 705 containing a fluid sample for measuring fluid density and sound speed of the fluid 708 inside of the tube or sample flow path or sample tank 711. The thickness 707 of the flow line wall 706 is known. A processor 702 and pulsing electronics 704 are provided to send an acoustic pulse from pulser 701a through wall 706 into fluid 705 in flow path 705 or from pulse 701b through wall 706 of thickness 707b to sample chamber 711. The transducer 701 receives echoes from the acoustic pulse, which are monitored by the processor. The present invention further comprises a wall standoff, which is an acoustic spacer interposed between the transducer and the wall that is made of the same material as the wall. This spacer simply increases the round trip distance and corresponding travel time for pulse-echo reverberations within the combined standoff plus near-wall material. It serves to lengthen the time between successive decaying echo pulses and so it serves to improve pulse separation, to avoid overlap of pulses and to improve quantification of energy in each pulse. The processor determines the density of the fluid in the sample flow line by performing the functions described in FIG. 10.

Turning now to FIG. 8, an example of the current invention deployed from a wire line 802 in a borehole 804 drilled in a formation 800. An extensible probe 801 extracts fluid from the formation 800. The extracted formation fluid flow through flow line 705 into sample tank 711 where the density determination module 700 of the present invention determines the density of the formation fluid. Stablizers 703 hold the tool 50 and extensible probe 801 in place during extraction of formation fluid. The results of the density determination are acted on by processor 702 or the results are sent to the surface 51 to be acted on by surface processor and control 1000.

Turning now to FIG. 9, another example of the current invention is shown deployed from a drill string 901. Straddle packer 903 hold tool 50 in place during the entry of fluid through flow path 705 to density device 700. The fluid can come from the annulus 805 between the tool 50 and the well bore 804 or from the formation 800. Fluid can be routed to the sample tank 711 or back to the well bore annulus 805 as desired based on the results of the density determination performed by the present invention 700. The results of the density determination can be acted on by processor 702 or the results can be sent to the surface 51 to be acted on by surface processor and control 1000.

Figure 10:
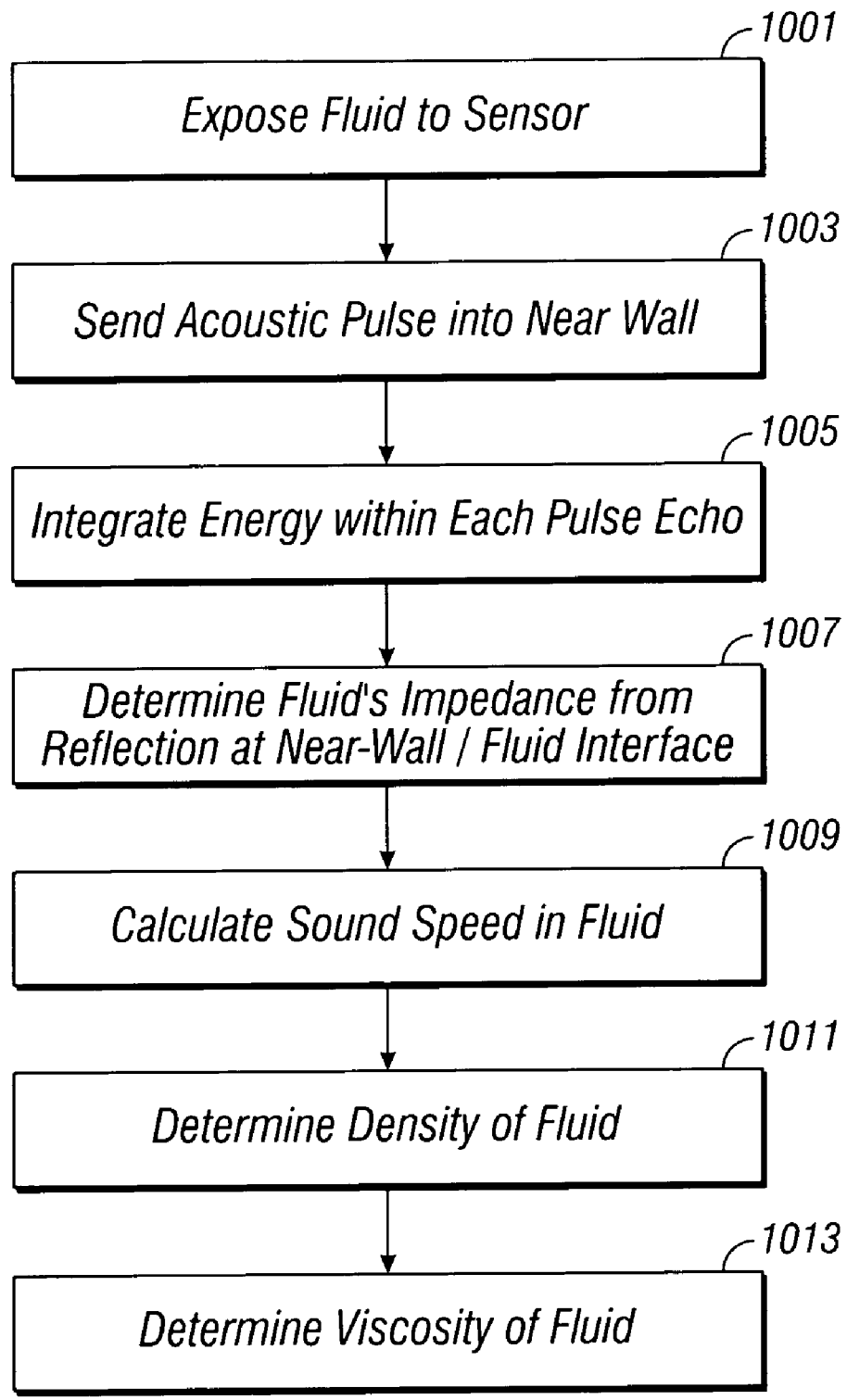
FIG. 10 illustrates an example of the functions performed by the present invention.

Turning now to FIG. 10, an example of the functions performed by the present invention is illustrated. As shown in block 1001 the present invention captures a fluid sample in a flow line from the formation or the borehole. In block 1003 the present invention then sends an acoustic pulse into the fluid sample in the flow line or sample tank. The processor of the present invention then monitors the echo returns within the wall of the flow line or sample tank and integrates the energy of each acoustic echo pulse. The processor determines the slope of the decay of the integrated acoustic echo pulses bouncing inside of the wall of the flow line. In block 1007 the present invention then determines the reflection coefficient for the inner wall/fluid interface. In block 1009 the present invention determines the speed of sound in the fluid. In block 1011 the present invention determines the density of the fluid in the flow line as described above. In block 1013 the present invention determines the viscosity of the fluid in the flow line as described above.

The present invention provides a method and apparatus for real time downhole fluid sound speed and real time downhole fluid density. Monitored over time, this can serve as a measure of fluid sample cleanup as the fluid is pumped form the formation. The measured fluid density will initially change more rapidly and eventually change more slowly over time as the fluid cleans up to it asymptotic limit. Similarly, viscosity changes over time can be used to monitor cleanup.

The exemplary embodiment of the present invention provides an acoustic pulsing device on the outer wall of a small sample flow tube through which fluid from the formation or wellbore is being pumped. This sample tube wall is not thick enough to allow for an internal reflection slot (a void) of the type described in U.S. Pat. No. 6,189,383 (the '383 patent). Also, the time windows for integration in the '383 patent (FIGS. 5 and 6 of '383) are overlapping and they include more than one pulse echo unlike the present invention, in which integration performed over each individual pulse without any overlap. The present invention fits a line between the echo number and the logarithm of the energy in each echo, as opposed to integrating over more that one pulse echo, as done in the '383 patent. The present invention does not need an internal reflection slot because it is the slope of this best fit line that indicates the acoustic impedance of whatever fluid is in contact with the tube wall.

Figure 11:
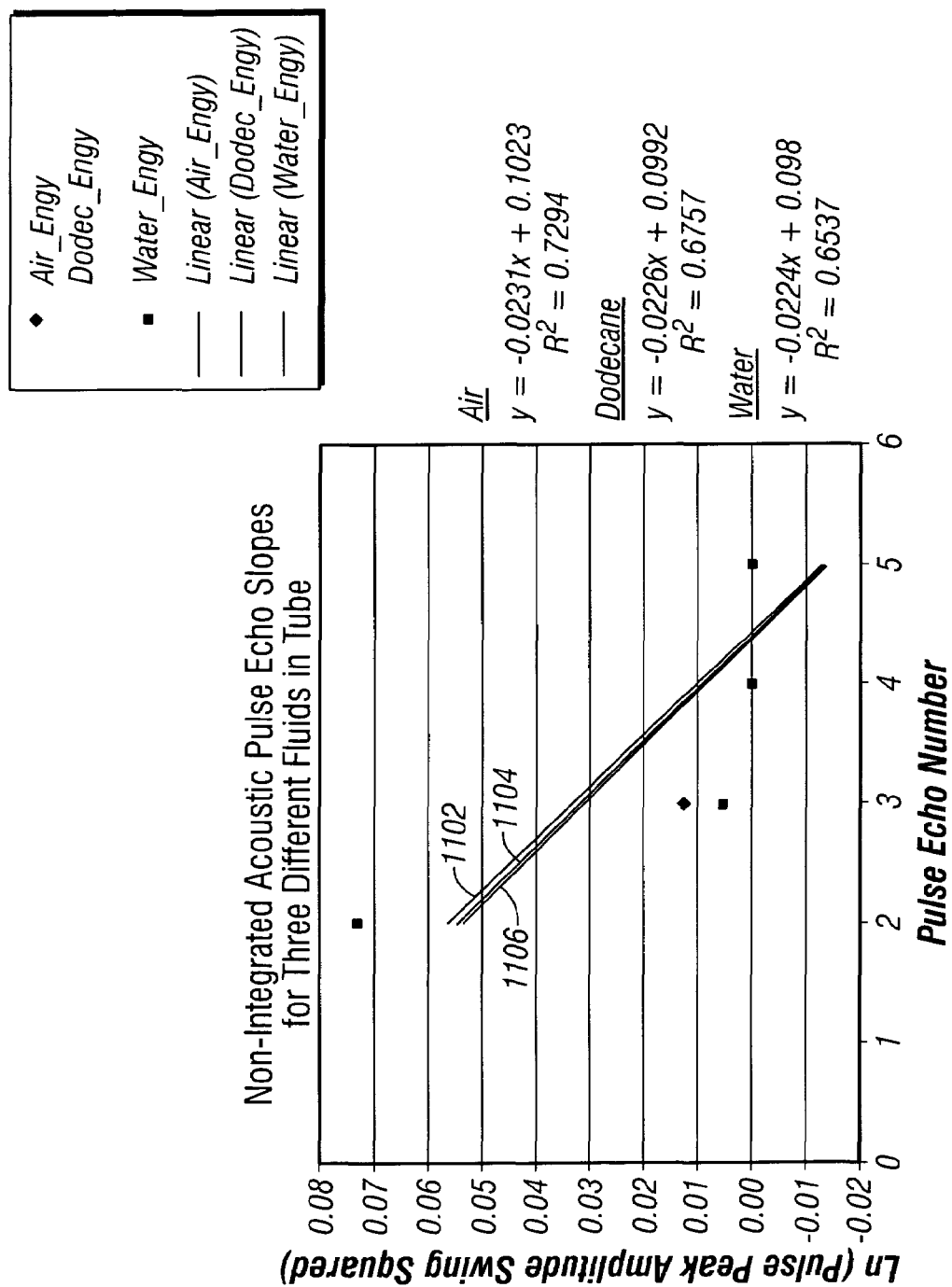
FIG. 11 shows the poor results of applying the method of '962 patent compared to the lab verification experiment of the present invention.

The present invention is more accurate than prior attempts to determine density of unknown fluids such at that described U.S. Pat. No. 5,741,962 (the '962 patent). In the '962 patent, reflection coefficients and the corresponding fluid density are calculated from peak-to-peak amplitudes (FIGS. 4A and 4B of the '962 patent), which can be very unreliable and prone to aliasing, sampling, and other experimental measurement errors. FIG. 11 shows the poor results of applying the method of '962 patent to the lab verification experiment of the present invention. It plots the logarithm of the square of the maximum amplitude swing within one cycle against pulse echo number. Now, instead of the high coefficients of determination ($R^2$>0.99 in FIG. 5) obtained by the pulse-integration method of the present invention, the coefficients of determination vary from $R^2$=0.65 to $R^2$=0.73 and the points do not lie close to the best fit lines 1102, 1104, and 1106. The reason is that the '962 patent, like '383 patent, describes using an idealized signal. Only if the pulse shape remained completely unchanged from pulse-to-pulse (or from echo-to-echo of a single pulse) would the square of the peak-to-peak amplitude remain proportional to the integrated peak energy. However, from the experimental data in FIGS. 2–4 of this invention it is clear that successive pulse echoes are not simply rescaled copies of the previous pulse but that they undergo distortion, which causes the square of the peak amplitude swing to be an unreliable indicator of total pulse energy. The present invention estimates the energy under an entire pulse rather than relying on a single transient peak amplitude. Thus the present invention provides a more accurate method and apparatus than relying on a transient peak amplitude as in the '962 patent.

While the foregoing disclosure is directed to the preferred embodiments of the invention various modifications will be apparent to those skilled in the art. It is intended that all variations within the scope of the appended claims be embraced by the foregoing disclosure. Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto. The above example of an embodiment of the invention has been provided for illustration purposes only and is not intended to limit the scope of the invention, which is determined by the following claims.

What is claimed is:

1. A method for estimating a property of a fluid, comprising:
    transmitting a first acoustic pulse in a first member that is in contact with the fluid;
    detecting a plurality of acoustic pulse echo returns from an interface between the first member and the fluid;
    subdividing each acoustic pulse echo return in the plurality of acoustic pulse echo returns into a plurality of time windows and integrating an energy in each time window over the duration of said each acoustic pulse echo return to obtain the energy in said each of the plurality of acoustic pulse echo returns; and
    estimating the property of the fluid from the energy in each of the plurality of acoustic pulse echo returns.

2. The method of claim 1, wherein the property of the fluid comprises at least one of the set consisting of acoustic impedance, density and viscosity of the fluid.

3. The method of claim 1, further comprising: estimating a reflection coefficient of the interface between the first member and the fluid.

4. The method of claim 1, further comprising:
    estimating an acoustic impedance of the first member.

5. The method of claim 1, further comprising:
    estimating a slope of energy decay for the plurality of acoustic pulse echo returns.

6. The method of claim 1, wherein estimating the slope of energy decay further comprises performing a least squares fit to the plurality of acoustic pulse echo returns.

7. The method of claim 5, wherein estimating the slope of energy decay further comprises using all amplitude values within said each of the plurality of pulses to average out measurement errors in any single amplitude value.

8. The method of claim 7, wherein estimating the slope of energy decay further comprises integrating over each of the plurality of time windows.

9. The method of claim 5, wherein estimating the slope of energy decay further comprises subtracting root mean square noise from the energy in each of the plurality of acoustic pulse echo returns.

10. The method of claim 1, further comprising:
    transmitting a second acoustic pulse through the fluid; and
    estimating speed of sound through the fluid, using round trip travel time for the second acoustic pulse between the first member and a second member that is in contact with the fluid.

11. The method of claim 1, further comprising:
    transmitting a second acoustic pulse through the fluid; and
    estimating attenuation of the second acoustic pulse through the fluid.

12. The method of claim 11, wherein estimating the attenuation includes estimating the attenuation at a plurality of frequencies.

13. The method of claim 10, wherein transmitting the second acoustic pulse further comprises transmitting a plurality of acoustic pulses at a plurality of frequencies.

14. The method of claim 1, wherein the method is performed downhole.

15. An apparatus for estimating a property of a fluid, comprising:
    a vessel that contains the fluid;
    an acoustic pulser that transmits a first acoustic pulse into a first vessel member that is in contact with the fluid;
    a transducer that detects a plurality of acoustic pulse echo returns from an interface between the first vessel member and the fluid; and
    a processor configured to subdivide each acoustic pulse echo return in the plurality of acoustic pulse echo returns into a plurality of time windows and integrating an energy in each time window over the duration of said each acoustic pulse echo return to obtain the energy in each of the plurality of acoustic pulse echo returns and estimates the property of the fluid from the energy in said each of the plurality of acoustic pulse echo returns.

16. The apparatus of claim 15, wherein the vessel comprises at least one of the set consisting of a flask, pipe, conduit, sample chamber, flow pipe, tube, channel, and downhole tool housing.

17. The apparatus of claim 15, wherein the property comprises at least one of the set consisting of acoustic impedance, density and viscosity of the fluid.

18. The apparatus of claim 17, wherein the processor estimates a reflection coefficient of the interface between the first vessel member and the fluid.

19. The apparatus of claim 18, wherein the processor measures acoustic impedance of the first vessel member.

20. The apparatus of claim 15, wherein the processor estimates a slope of energy decay for the plurality of acoustic pulse echo returns.

21. The apparatus of claim 20, wherein the processor performs a least squares fit to the plurality of acoustic pulse echo returns.

22. The apparatus of claim 15, wherein the processor uses all amplitude values within said each of the plurality of acoustic pulse echo returns to average out measurement errors in any single amplitude value.

23. The apparatus of claim 22, wherein the processor integrates over each of the plurality of time windows.

24. The apparatus of claim 15, wherein the processor estimates the slope of energy decay from a value adjusted for noise for each of the plurality of acoustic pulse echo returns.

25. The apparatus of claim 15, wherein the acoustic pulser transmits a second acoustic pulse through the fluid and the processor estimates the speed of sound through the fluid using the round trip travel time for the second acoustic pulse between the first vessel member and a second member that is in contact with the fluid.

26. The apparatus of claim 15, wherein the acoustic pulser transmits a second acoustic pulse through the fluid and the processor estimates attenuation of the second acoustic pulse through the fluid.

27. The apparatus of claim 26, wherein the processor estimates the attenuation at a plurality of frequencies.

28. The apparatus of claim 25, wherein the acoustic pulser transmits a plurality of pulses at a plurality of frequencies.

29. The apparatus of claim 15, wherein the apparatus is located downhole.

30. A method for estimating a property of a fluid, comprising:
    generating a first acoustic pulse in the fluid that is in contact with a first member;
    detecting a plurality of acoustic pulse echo returns from an interface between the first member and the fluid;

subdividing each acoustic pulse echo return in the plurality of acoustic pulse echo returns into a plurality of time windows and integrating an energy in each time window over the duration of said each acoustic pulse echo return to obtain the energy in each of the plurality of acoustic pulse echo returns; and estimating the property of the fluid from the energy in each of the plurality of acoustic pulse echo returns.

31. An apparatus for estimating a property of a fluid, comprising:
a chamber that contains the fluid;
a transmitter that sends a first acoustic pulse into the fluid that is in contact with a first chamber member;
a transducer that detects a plurality of acoustic pulse echo returns from an interface between the first chamber member and the fluid; and
a processor configured to subdivide each acoustic pulse echo return in the plurality of acoustic pulse echo returns into a plurality of time windows and integrating the energy in each time window over the duration of each acoustic pulse echo return to obtain the energy in each of the plurality of acoustic pulse echo returns and estimates the property of the fluid from the energy in each of the plurality of acoustic pulse echo returns.

32. A downhole tool which is deployed in a borehole for estimating a property of a downhole fluid, comprising:
a vessel that contains the fluid;
an acoustic pulser that transmits a first acoustic pulse into a first vessel member that is in contact with the fluid;
a transducer that detects a plurality of acoustic pulse echo returns from an interface between the first vessel member and the fluid; and
a processor configured to subdivide each acoustic pulse echo return in the plurality of acoustic pulse echo returns into a plurality of time windows and integrating the energy in each time window over the duration of each acoustic pulse echo return to obtain the energy in each of the plurality of acoustic pulse echo returns and estimates the property of the fluid from the energy in each of the plurality of acoustic pulse echo returns.

33. The downhole tool of claim 32, wherein the vessel comprises one of a flask, pipe, conduit, sample chamber, flow pipe, tube, channel and downhole tool housing.

34. The downhole tool of claim 33, wherein the property comprises one of acoustic impedance, density and viscosity of the fluid.

35. The downhole tool of claim 34, wherein the processor estimates a reflection coefficient of the interface between the first vessel member and the fluid.

36. The downhole tool of claim 32, wherein the processor estimates a slope of energy decay for the plurality of acoustic pulse echo returns.

37. The downhole tool of claim 36, wherein the processor performs a least squares fit to the plurality of acoustic pulse echo returns.

38. A method for estimating a property of a fluid, comprising:
generating a first acoustic pulse in the fluid that is in contact with a first member;
detecting a plurality of acoustic pulse echo returns from an interface between the first member and the fluid;
subdividing each acoustic pulse echo return in the plurality of acoustic pulse echo returns into a plurality of time windows and integrating the energy in each time window over the duration of each acoustic pulse echo return to obtain the energy in each of the plurality of acoustic pulse echo returns;
subtracting root mean square noise from the energy in each of the plurality of acoustic pulse echo returns; and
estimating the property of the fluid from the energy after subtraction of the noise in each of the plurality of acoustic pulse echo returns.

* * * * *